United States Patent [19]

Machida et al.

[11] Patent Number: 4,788,095
[45] Date of Patent: * Nov. 29, 1988

[54] METAL OXIDE MAGNETIC SUBSTANCE AND A MAGNETIC FILM CONSISTING THEREOF AND THEIR USES

[75] Inventors: Hazime Machida, Tokyo; Hitoshi Nakamura, Numazu; Fumiya Omi, Numazu; Atsuyuki Watada, Numazu; Yuziro Kaneko, Numazu, all of Japan

[73] Assignee: Ricoh Company, Ltd., Tokyo, Japan

[*] Notice: The portion of the term of this patent subsequent to Dec. 31, 2002 has been disclaimed.

[21] Appl. No.: 97,301

[22] Filed: Sep. 14, 1987

Related U.S. Application Data

[63] Continuation of Ser. No. 696,535, Jan. 30, 1985, abandoned.

[30] Foreign Application Priority Data

Feb. 6, 1984 [JP] Japan ................. 59-19671
Oct. 9, 1984 [JP] Japan ................ 59-211852
Oct. 9, 1984 [JP] Japan ................ 59-211853
Oct. 9, 1984 [JP] Japan ................ 59-211854
Oct. 9, 1984 [JP] Japan ................ 59-211855

[51] Int. Cl.⁴ ............................................. G11B 7/24
[52] U.S. Cl. .................................. 428/172; 428/213; 428/214; 428/215; 428/332; 428/336; 428/457; 428/694; 428/702; 428/900
[58] Field of Search ............... 428/694, 900, 695, 702, 428/332, 172, 457, 161, 213-215, 336; 365/122; 369/13, 288; 360/131-135

[56] References Cited

U.S. PATENT DOCUMENTS 3,638,207  1/1972  Smith et al. ............... 252/62.58
3,770,639 11/1973  Okazaki et al. ........... 252/62.58
4,544,602 10/1985  Kobayashi et al. ........... 428/900
4,562,105 12/1985  Michida et al. .............. 428/900
4,670,322  6/1987  Nakamura et al. ............ 428/172
4,670,323  6/1987  Nakamura et al. ............ 428/172

FOREIGN PATENT DOCUMENTS 3413086 11/1984 Fed. Rep. of Germany .
  38919 10/1974 Japan .
   2225  1/1983 Japan .
2002338  2/1979 United Kingdom ........... 428/692

Primary Examiner—George F. Lesmes
Assistant Examiner—William M. Atkinson
Attorney, Agent, or Firm—Cooper & Dunham

[57] ABSTRACT

This invention provides a metal oxide magnetic substance represented by the following general formula:

$$MeO \cdot n[Ma_x Mb_y Co_2 Fe_{2-(x+m/3y+2/3z)} O_3]$$

[wherein, Me, Ma, Mb, x, y, z, m and n are each as mentioned below.

Me: at least one divalent metal selected from the group consisting of Ba, Sr and Pb, Ma: at least one trivalent metal selected from the group consisting of Ga, Al, Cr and Rh, Mb: at least one divalent to tetravalent metal selected from the group consisting of Zn (divalent); Ni, In, Sc, Cr, Sb, Bi, Y and Sm (trivalent), and Mo, Ti, Sn, Ta, V, Mn, Ir, Hf, Pd, Nb, Re, Pt, Os, Zr, Tc, Rh, Ge, Ru, W, Te, Pr and Ce (tetravalent) wherein, the metal represented by Mb is not the same as that represented by Me or Ma)

$x: 0 < x \leq 0.5$ $y: 0 < y \leq 0.5$ $z: 0 < z \leq 0.5$ (wherein, $0 < x+y+z \leq 1$)

m: an ionic valency of Mb $n: 5 \leq n \leq 6$ ], a magnetic film consisting of said metal oxide magnetic substance, and their uses as magneto optical recording medium and perpendicular magnetic recording medium.

26 Claims, 1 Drawing Sheet

METAL OXIDE MAGNETIC SUBSTANCE AND A MAGNETIC FILM CONSISTING THEREOF AND THEIR USES

This is a continuation of application Ser. No. 696,535, filed Jan. 30, 1985, now abandoned.

BACKGROUND OF THE INVENTION:

(1) Field of the invention

The present invention relates to a metal oxide magnetic substance, a magnetic film consisting of this magnetic substance, and their uses as magneto optical recording medium and perpendicular magnetic recording medium.

(2) Description of the prior art

In recent years, magneto optical recording mediums designed to carry out information recording by writing domains in a magnetic thin film making use of the thermal effects of light and read out information making use of magneto optical effects (Kerr effect, Faraday effect and the like) have been watched. Recording of information on this magneto optical recording medium is carried out making use of the rapid variation characteristic of a coercive force corresponding to the temperature variation in the neighborhood of the Curie temperature or compensation temperature of the magnetic substance. For instance, information is recorded as recording bit in the manner of radiating a laser beam modulated with a divalent signal selectively on a perpendicularly magnetized magnetic film under impression of magnetic field for heating the radiated portion over the Curie temperature, and thus reducing the coercive force on said portion for inverting the direction of magnetization. Regeneration, i.e. reading out, of the recorded information is carried out in the manner of radiating a polarized laser beam on the magnetic film, and thus detecting the direction of perpendicular magnetization from the difference in magneto optical effects between the recorded area and the non-recorded area, for instance the difference in Faraday's rotation angle.

The magnetic substance or magnetic film used in the magneto optical recording medium like this is required to have the following characteristics:

(1) Perpendicular magnetizability
(2) Powerful magneto optical effects
(3) Moderate coercive force permitting recording and regeneration by the laser beam and enhancing the memory stability (which is in the range of about 0.5–6 KOe. In case it is over 6 KOe, the impressing magnetic field required at the time of recording becomes powerful, while in case it is 0.3 KOe or less, the memory stability deteriorates.), and
(4) Moderate Curie temperature permitting recording and regeneration by the laser beam and enhancing the memory stability (which is in the range of about 100°–400° C. In case it is over 400° C., recording by means of the laser beam becomes difficult, while in case it is less than 100° C., the memory stability deteriorates.).

Usually, the magnetic substances used in magneto optical recording mediums were mostly occupied by those consisting of amorphous alloys made of rare earth metals and transition metals. The preparation of magneto optical recording mediums using such amorphous alloy magnetic substances was carried out generally in the manner of adhering said magnetic substance, for instance Tb-Fe alloy, on a substrate such as glass plate by vacuum vapor-deposition, sputtering or the like in the degree of about 0.1–1 $\mu$m in thickness to form a magnetic film.

The magneto optical recording medium using aforesaid amorphous alloy magnetic substance is advantageous in that it can be recorded at high speed (at frequency=1 MHz) by means of a semi-conductor laser beam because it is of a high recording sensitivity, but is heavily disadvantageous in that the magneto optical characteristic of the magnetic film deteriorates with a lapse of time because the amorphous alloy magnetic substance, in particular the rare earth metal component, is subject to oxidizing corrosion. In order to prevent this, it is known to provide a protective layer consisting of SiO, $SiO_2$ or the like on an amorphous magnetic film by means of vacuum vapordeposition, sputtering or the like, but this is disadvantageous in that at the time of preparing the magnetic film or the protective layer, the magnetic film is oxidized and corroded by $O_2$ remaining in the vacuum, $O_2$, $H_2O$ or the like absorbed to the surface of the substrate, and $O_2$, $H_2O$ or the like contained in the target consisting of the alloy magnetic substance with a lapse of time, and further the oxidizing corrosion is enhanced by the light and heat at the time of recording. Further, the amorphous magnetic substance is disadvantageous in that it is liable to be crystalized by heat and therefore its magnetic characteristic is liable to be deteriorated. Still further, there has been brought about the problem that because this magnetic film is low in transmission coefficient in the laser-emitted wavelength region, the recorded information is read out by means of the magneto optical effects caused by reflection from the surface of the magnetic film, namely Kerr effect, but the obtained regeneration sensitivity is low because Kerr rotation angle is generally small.

SUMMARY OF THE INVENTION

A primary object of the present invention is to provide a metal oxide magnetic substance and a magnetic film which are free from the fear of oxidizing corrosion, are high in transmission coefficient, are superior in perpendicular magnetizability, are high in magneto optical effects, and have moderate Curie temperature and coercive force, and accordingly are suitably used especially for magneto optical recording mediums.

A secondary object of the present invention is to provide a magneto optical recording medium and a perpendicular magnetic recording medium which have magnetic films provided with characteristics as mentioned above, accordingly are superior in durability, are high in recording and regeneration sensitivity, and are superior in memory stability.

The metal oxide magnetic substance according to the present invention is the one represented by the general formula (I):

$$MeO \cdot n[Ma_x Mb_y Co_z Fe_{2-(x+(m/3)y+(2/3)z)} O_3] \qquad (I)$$

[wherein, Me, Ma, Mb, x, y, z, m and n are each as mentioned below.

Me: at least one divalent metal selected from the group consisting of Ba, Sr and Pb, Ma: at least one trivalent metal selected from the group consisting of Ga, Al, Cr and Rh, Mb: at least one divalent to tetravalent metal selected from the group consisting of Zn (divalent); Ni, In, Sc, Cr, Sb, Bi, Y and Sm (trivalent); and Mo, Ti, Sn, Ta, V, Mn, Ir, Hf, Pd, Nb, Re, Pt, Os, Zr, Tc, Rh, Ge, Ru, W, Te, Pr and Ce (tetravalent) (wherein, the metal represented by Mb is not the same as that represented by Me or Ma.)

x: $0 < x \leq 0.5$
y: $0 < y \leq 0.5$
z: $0 < z \leq 0.5$ (wherein $0 < x+y+z \leq 1$)
m: an ionic valency of Mb
n: $5 \leq n \leq 6$ ], the magnetic film according to the present invention comprises the metal oxide magnetic substances represented by said general formula (I), and the magneto optical recording medium and the perpendicular magnetic recording medium according to the present invention are each the one having, on a substrate, a magnetic film comprising the metal oxide magnetic substance represented by said general formula. When the metal magnetic substance represented by said general formula (I) is used for the perpendicular magnetic recording medium, it is preferably that x, y and z have low values (for instance, x: $0 < x \leq 0.2$, $0 < y \leq 0.2$, $0 < z \leq 0.2$, and $0 < x+y+z \leq 0.5$).

Various metal oxide magnetic substances have hitherto been studied as the magnetic bubble materials. As the hexagonal metal oxide magnetic substance there is known the hexagonal magnetoplumbite represented by for instance the general formula (A):

$$\text{MeO.n[Fe}_2\text{O}_3\text{]} \tag{A}$$

(wherein, Me and n are the same as defined in the general formula (I)).

We paid attention to the fact that since the magnetic substance of this sort is itself oxide, there is no fear of being deteriorated by oxidation, and that even when the film thickness is increased, said substance still holds permeability in the laser wavelength region and accordingly Faraday effect can be utilized. Faraday effect is a rotation angle of a deflection surface against the permeable light and so is more powerful than Kerr effect. By increasing the film thickness, a higher sensitivity can be achieved and thus the S/N ratio can be enlarged. However, the magnetoplumbite represented by the general formula (A) is disadvantageous in that since it is difficult to be perpendicularly magnetized and further Curie temperature Tc is high (450° C. or more), it makes the recording using the semi-conductor laser beam still more difficult as described previously, and so it itself can not be utilized as the material for magneto optical recording medium. In view of this, we have carried out various investigations to find that when a part of the Fe atoms in the general formula (A) is substituted by Co, perpendicular magnetization is enhanced and further the magneto optical performances, in particular Faraday rotation angle ($\theta_F/\mu m$) is improved, and that when a part of said Fe atoms is substituted by the metal atoms represented by said Mb, Tc lowers. However, Mb metals have generally displayed the tendency of deteriorating the coercive force. As described above, when Hc is too low the memory becomes unstable, which is not suitable for high density recording. In view of this, we tried to substitute a part of the Fe atoms in the general formula (A), which have been substituted by the Mb atoms and simultaneously by the Co atoms, further by the metals represented by said Ma to find that Hc can be increased while deteriorating Tc.

As is evident from the aforegoing, the present invention has made the metal oxide of the general formula (A) applicable especially as the material for magneto optical recording medium, which may be recorded and regenerated by the semi-conductor laser beams, by substituting a part of Fe atoms in the metal oxide of the general formula (A), which was not regarded as the material for use in magneto optical recording medium due to its high Curie temperature, by Co, Ma metal and Mb metal atoms so that perpendicular magnetizability and magneto optical effects may be enhanced and simultaneously the Curie temperature may be lowered while maintaining coercive force at a suitably high degree required for the memory.

In the metal oxide magnetic substances represented by said general formula (I) of the present invention, the tetravalent metals among Mb metals function to compensate the lack of ionic valency caused by substitution of a part of the Fe (trivalent) atoms by Co (divalent) and further the divalent metal (Zn) of Mb metals. Further, said Mb metals, in particular tetravalent metals, include those being inferior in the operation of lowering Curie temperature (for instance, Ir, Ta, Hf, Pt, Os, Zr, Tc, W, Te, Pr, Ce and the like). When using these metals, it is preferably to use those superior in the operation of lowering Curie temperature (for instance, divalent Zn, trivalent In, Sc and the like, Tetravalent Ti, Sn, Mn, V, Pd, Nb, Re, Rh, Ge, Ru and the like).

The metal oxide magnetic substance according to the present invention may be prepared by mixing (a) at least one member of $BaCO_3$, $SrCO_3$ and $PbCO_3$ (or PbO), (b) at least one oxide of said Mb metals, (c) CoO, (d) $Fe_2O_3$ and (e) at least one oxide of said Ma metals and pulverizing, placing the same in a suitable-shaped metal mold for molding, and thereafter sintering it at a temperature of 1200°–1400° C.

The concrete examples of the thus obtained metal oxide magnetic substance according to the present invention are enumerated as follows.

| Magnetic substance No. | Composition |
|---|---|
| 1-1 | $BaO.6.0[Ga_{0.2}In_{0.1}Co_{0.2}Fe_{1.57}O_3]$ |
| 1-2 | $BaO.6.0[Ga_{0.5}Sc_{0.2}Co_{0.3}Fe_{1.1}O_3]$ |
| 1-3 | $BaO.6.0[Ga_{0.6}Zn_{0.22}Co_{0.2}Fe_{1.12}O_3]$ |
| 1-4 | $BaO.6.0[Ga_{0.5}Ti_{1.06}Co_{0.12}Fe_{1.34}O_3]$ |
| 1-5 | $SrO.6.0[Al_{0.6}Cr_{0.2}Co_{0.2}Fe_{1.0}O_3]$ |
| 1-6 | $SrO.6.0[Al_{0.5}Ti_{0.11}Co_{0.21}Fe_{1.31}O_3]$ |
| 1-7 | $BaO.6.0[Ga_{0.4}In_{0.2}Bi_{0.1}Co_{0.2}Fe_{1.17}O_3]$ |
| 1-8 | $BaO.6.0[Ga_{0.5}Zn_{0.3}V_{0.12}Co_{0.2}Fe_{1.13}O_3]$ |
| 1-9 | $SrO.6.0[Al_{0.5}Ti_{0.21}Sn_{0.12}Co_{0.2}Fe_{0.93}O_3]$ |
| 1-10 | $SrO.6.0[Al_{0.4}Sc_{0.3}Mn_{0.1}Co_{0.21}Fe_{1.06}O_3]$ |
| 1-11 | $PbO.6.0[Ga_{0.5}Ti_{0.3}Y_{0.1}Co_{0.21}Fe_{0.86}O_3]$ |
| 1-12 | $BaO.6.0[Al_{0.5}Zn_{0.31}Bi_{0.1}Co_{0.2}Fe_{1.06}O_3]$ |
| 1-13 | $BaO.6.0[Al_{0.6}Ti_{0.3}Bi_{0.1}Co_{0.21}Fe_{0.76}O_3]$ |
| 1-14 | $BaO.6.0[Al_{0.2}Ti_{0.06}Co_{0.12}Fe_{1.64}O_3]$ |
| 1-15 | $BaO.6.0[Ga_{0.5}Zn_{0.21}Bi_{0.1}Co_{0.11}Fe_{1.19}O_3]$ |
| 2-1 | $BaO.6.0[Ga_{0.1}Ti_{0.1}Co_{0.1}Fe_{1.7}O_3]$ |
| 2-2 | $BaO.6.0[Ga_{0.05}Mn_{0.05}Co_{0.05}Fe_{1.85}O_3]$ |
| 2-3 | $BaO.5.6[Ga_{0.15}Sn_{0.15}Co_{0.15}Fe_{1.55}O_3]$ |
| 2-4 | $BaO.5.9[Ga_{0.2}V_{0.2}Co_{0.2}Fe_{1.4}O_3]$ |
| 2-5 | $BaO.5.8[Ga_{0.3}Ir_{0.1}Co_{0.1}Fe_{1.5}O_3]$ |
| 2-6 | $SrO.6.0[Ga_{0.1}Ta_{0.3}Co_{0.3}Fe_{1.3}O_3]$ |
| 2-7 | $SrO.5.5[Ga_{0.1}Hf_{0.1}Co_{0.1}Fe_{1.7}O_3]$ |
| 2-8 | $PbO.6.0[G_{0.02}Nb_{0.07}Co_{0.07}Fe_{1.64}O_3]$ |
| 2-9 | $PbO.5.5[Ga_{0.2}Pd_{0.1}Co_{0.1}Fe_{1.6}O_3]$ |
| 2-10 | $BaO.6.0[Ga_{0.2}Re_{0.1}Co_{0.1}Fe_{1.6}O_3]$ |
| 2-11 | $BaO.5.8[Ga_{0.2}Pt_{0.1}Co_{0.1}Fe_{1.6}O_3]$ |
| 2-12 | $BaO.5.6[Ga_{0.2}Os_{0.1}Co_{0.1}Fe_{1.6}O_3]$ |
| 2-13 | $BaO.5.9[Ga_{0.2}Zr_{0.1}Co_{0.1}Fe_{1.6}O_3]$ |
| 2-14 | $BaO.5.9[Rh_{0.2}Tc_{0.1}Co_{0.1}Fe_{1.6}O_3]$ |
| 2-15 | $BaO.6.0[Rh_{0.2}W_{0.1}Co_{0.1}Fe_{1.6}O_3]$ |
| 2-16 | $BaO.6.0[Rh_{0.2}Ge_{0.1}Co_{0.1}Fe_{1.7}O_3]$ |
| 2-17 | $SrO.6.0[Rh_{0.2}Ru_{0.1}Co_{0.1}Fe_{1.6}O_3]$ |
| 2-18 | $PbO.5.5[Rh_{0.2}Te_{0.1}Co_{0.1}Fe_{1.6}O_3]$ |
| 2-19 | $PbO.5.9[Rh_{0.2}Pr_{0.1}Co_{0.1}Fe_{1.6}O_3]$ |

-continued

| Magnetic substance No. | Composition |
|---|---|
| 2-20 | $PbO.6.0[Rh_{0.2}Ce_{0.1}Co_{0.1}Fe_{1.6}O_3]$ |
| 2-21 | $BaO.6.0[Rh_{0.1}Ti_{0.1}Co_{0.1}Fe_{1.7}O_3]$ |
| 2-22 | $BaO.6.0[Al_{0.1}Ti_{0.1}Co_{0.1}Fe_{1.7}O_3]$ |
| 2-23 | $BaO.5.5[Al_{0.1}Rh_{0.1}Co_{0.1}Fe_{1.7}O_3]$ |
| 2-24 | $BaO.5.9[Al_{0.1}Sn_{0.1}Co_{0.1}Fe_{1.7}O_3]$ |
| 2-25 | $SrO.6.0[Al_{0.1}Ta_{0.1}Co_{0.1}Fe_{1.7}O_3]$ |
| 2-26 | $PbO.6.0[Al_{0.1}V_{0.1}Co_{0.1}Fe_{1.7}O_3]$ |
| 2-27 | $BaO.6.0[Cr_{0.1}Ti_{0.1}Co_{0.1}Fe_{1.7}O_3]$ |
| 2-28 | $BaO.5.5[Cr_{0.1}Rh_{0.1}Co_{0.1}Fe_{1.7}O_3]$ |
| 2-29 | $PbO.6.0[Cr_{0.1}W_{0.1}Co_{0.1}Fe_{1.7}O_3]$ |
| 2-30 | $SrO.6.0[Cr_{0.1}Ta_{0.1}Co_{0.1}Fe_{1.7}O_3]$ |
| 2-31 | $SrO.5.5[Cr_{0.1}Ge_{0.1}Co_{0.1}Fe_{1.7}O_3]$ |
| 2-32 | $BaO.6.0[Ga_{0.1}Rh_{0.1}Co_{0.1}Fe_{1.7}O_3]$ |
| 2-33 | $BaO.6.0[Ga_{0.1}Ti_{0.05}Co_{0.05}Fe_{1.8}O_3]$ |
| 2-34 | $BaO.6.0[Al_{0.1}Zn_{0.1}Ti_{0.2}Co_{0.1}Fe_{1.5}O_3]$ |
| 2-35 | $BaO.6.0[Ga_{0.1}In_{0.1}V_{0.1}Co_{0.1}Fe_{1.6}O_3]$ |
| 2-36 | $BaO.6.0[Al_{0.1}Sc_{0.1}Nb_{0.1}Co_{0.1}Fe_{1.6}O_3]$ |
| 2-37 | $SrO.6.0[Rh_{0.1}Zn_{0.1}W_{0.2}Co_{0.1}Fe_{1.5}O_3]$ |
| 2-38 | $PbO.6.0[Rh_{0.1}In_{0.1}Pt_{0.05}Co_{0.05}Fe_{1.7}O_3]$ |
| 2-39 | $BaO.6.0[Ga_{0.1}Zn_{0.1}W_{0.15}Co_{0.05}Fe_{1.7}O_3]$ |
| 2-40 | $BaO.6.0[Al_{0.1}Zn_{0.1}W_{0.2}Co_{0.1}Fe_{1.5}O_3]$ |
| 3-1 | $BaO.6.0[Al_{0.2}Ti_{0.1}Co_{0.1}Fe_{1.6}O_3]$ |
| 3-2 | $BaO.5.5[Al_{0.1}Ti_{0.1}Co_{0.1}Fe_{1.7}O_3]$ |
| 3-3 | $BaO.5.7[Ga_{0.1}Sc_{0.1}Co_{0.12}Fe_{1.72}O_3]$ |
| 3-4 | $BaO.5.6[Ga_{0.3}In_{0.1}Co_{0.15}Fe_{1.50}O_3]$ |
| 3-5 | $BaO.5.9[Ga_{0.2}Zn_{0.12}Co_{0.12}Fe_{1.64}O_3]$ |
| 3-6 | $SrO.5.5[Al_{0.2}Cr_{0.1}Co_{0.12}Fe_{1.52}O_3]$ |
| 3-7 | $SrO.5.8[Ga_{0.1}In_{0.1}Bi_{0.1}Co_{0.21}Fe_{1.46}O_3]$ |
| 3-8 | $SrO.5.7[Ga_{0.2}Zn_{0.08}V_{0.16}Co_{0.08}Fe_{0.48}O_3]$ |
| 3-9 | $SrO.5.6[Al_{0.2}Ti_{0.08}Sn_{0.08}Co_{0.1}Fe_{1.52}O_3]$ |
| 3-10 | $SrO.5.9[Al_{0.3}Sc_{0.1}Mn_{0.1}Co_{0.11}Fe_{1.46}O_3]$ |
| 3-11 | $PbO.5.5[Ga_{0.1}Ti_{0.1}Y_{0.05}Co_{0.1}Fe_{1.65}O_3]$ |
| 3-12 | $PbO.5.9[Ga_{0.1}Zn_{0.1}Bi_{0.05}Co_{0.1}Fe_{1.65}O_3]$ |
| 3-13 | $PbO.5.7[Al_{0.15}Ti_{0.1}Bi_{0.05}Co_{0.1}Fe_{1.6}O_3]$ |
| 3-14 | $PbO.5.6[Al_{0.15}Zn_{0.12}Bi_{0.05}Co_{0.12}Fe_{1.53}O_3]$ |
| 3-15 | $BaO.5.9[Ga_{0.15}Ti_{0.05}Co_{0.05}Fe_{1.75}O_3]$ |
| 4-1 | $BaO.6.0[Al_{0.1}Ti_{0.1}Co_{0.1}Fe_{1.7}O_3]$ |
| 4-2 | $BaO.5.5[Ga_{0.1}Ti_{0.1}Co_{0.1}Fe_{1.7}O_3]$ |
| 4-3 | $PbO.6.0[Ga_{0.1}Sn_{0.1}Co_{0.1}Fe_{1.7}O_3]$ |
| 4-4 | $PbO.5.5[Ga_{0.1}Mn_{0.1}Co_{0.1}Fe_{1.7}O_3]$ |
| 4-5 | $SrO.6.0[Al_{0.1}Ti_{0.15}Co_{0.15}Fe_{1.6}O_3]$ |
| 4-6 | $SrO.5.5[Al_{0.2}Ti_{0.05}Co_{0.05}Fe_{1.7}O_3]$ |
| 4-7 | $BaO.6.0[Rh_{0.1}Sn_{0.15}Co_{0.15}Fe_{1.6}O_3]$ |
| 4-8 | $BaO.5.7[Al_{0.1}Mn_{0.1}Co_{0.1}Fe_{1.7}O_3]$ |
| 4-9 | $BaO.6.0[Al_{0.2}Ti_{0.2}Co_{0.2}Fe_{1.4}O_3]$ |
| 4-10 | $BaO.6.0[Ga_{0.1}Mn_{0.1}Co_{0.1}Fe_{1.7}O_3]$ |
| 5-1 | $BaO.6.0[Al_{0.1}Ta_{0.1}Co_{0.1}Fe_{1.7}O_3]$ |
| 5-2 | $SrO.6.0[Al_{0.1}Rh_{0.1}Co_{0.1}Fe_{1.7}O_3]$ |
| 5-3 | $BaO.6.0[Ga_{0.1}Ge_{0.1}Co_{0.1}Fe_{1.7}O_3]$ |
| 5-4 | $BaO.5.8[Ga_{0.1}Ru_{0.1}Co_{0.1}Fe_{1.7}O_3]$ |
| 5-5 | $BaO.5.6[Rh_{0.1}In_{0.1}Co_{0.1}V_{0.1}Fe_{1.6}O_3]$ |
| 5-6 | $BaO.6.0[Cr_{0.1}Sc_{0.1}Hf_{0.1}Co_{0.1}Fe_{1.6}O_3]$ |
| 5-7 | $SrO.6.0[Rh_{0.2}Ir_{0.1}Co_{0.1}Fe_{1.6}O_3]$ |
| 5-8 | $PbO.5.8[Ga_{0.2}Zn_{0.1}Pd_{0.1}Co_{0.1}Fe_{1.5}O_3]$ |
| 5-9 | $PbO.6.0[Al_{0.1}W_{0.1}Ni_{0.1}Co_{0.1}Fe_{1.5}O_3]$ |
| 5-10 | $SrO.5.5[Al_{0.1}Re_{0.2}Zn_{0.1}Co_{0.1}Fe_{1.5}O_3]$ |
| 5-11 | $SrO.6.0[Al_{0.2}In_{0.1}Os_{0.1}Co_{0.1}Fe_{1.5}O_3]$ |
| 5-12 | $SrO.6.0[Ga_{0.1}Sc_{0.1}Zr_{0.1}Co_{0.1}Fe_{1.6}O_3]$ |
| 5-13 | $BaO.6.0[Al_{0.1}Tc_{0.1}Zn_{0.05}Co_{0.05}Fe_{1.7}O_3]$ |
| 5-14 | $BaO.6.0[Al_{0.2}In_{0.05}Te_{0.05}Co_{0.05}Fe_{1.65}O_3]$ |
| 5-15 | $BaO.6.0[Ga_{0.1}Sc_{0.1}Ce_{0.1}Co_{0.1}Fe_{1.6}O_3]$ |
| 5-16 | $BaO.6.0[Ga_{0.1}Pr_{0.1}In_{0.1}Co_{0.1}Fe_{1.6}O_3]$ |
| 5-17 | $BaO.6.0[Rh_{0.1}Mo_{0.1}Sc_{0.1}Co_{0.1}Fe_{1.5}O_3]$ |
| 5-18 | $BaO.6.0[Cr_{0.1}Rh_{0.2}Co_{0.2}Fe_{1.5}O_3]$ |
| 5-19 | $BaO.6.0[Al_{0.1}Ir_{0.1}Co_{0.1}Fe_{1.7}O_3]$ |
| 5-20 | $[Ba_{0.5}Pb_{0.5}].6.0[Al_{0.1}Rh_{0.1}Co_{0.1}Fe_{1.7}O_3]$ |
| 5-21 | $[Sr_{0.5}Pb_{0.5}].6.0[Al_{0.1}Ta_{0.1}Co_{0.1}Fe_{1.7}O_3]$ |
| 5-22 | $[Ba_{0.5}Sr_{0.5}].6.0[Ga_{0.1}V_{0.1}In_{0.1}Co_{0.1}Fe_{1.6}O_3]$ |

The above mentioned metal oxide magnetic substance according to the present invention may be added with metals such as Cu, Ca, Mg, La, Tb, Gd, Dy, Ho, Er, Tm, Yb, Ln and the like for the purpose of regulating the ionic valency minutely, further enhancing the magneto optical effects, or regulating Curie temperature, coercive power and the like.

The metal oxide magnetic substance according to the present invention can itself form a continuous thin film. The thus formed magnetic thin film is formed of minute polycrystals less than 0.1 μm having a strong crystal magnetic anisotropy in the direction perpendicular to the recording medium surface, namely this magnetic thin film is formed of polycrystals comprising many and successively arranged hexagonal single crystals of ferrimagnetic oxide orientated in the direction perpendicular to the recording medium surface, and so is superior in permeability against the laser beam. Due to this, said magnetic film has characteristics suitable for the magneto optical recording medium, for instance, such that Faraday's rotation angle can be enlarged, regeneration characteristic is superior and high density recording can be achieved due to little noise. As said film is superior in perpendicular magnetizability and can form magnetic bubbles in high density, it is also usable as a perpendicularly magnetized film, for instance a perpendicular magneto recording medium. In this connection, it is to be noted that the normal magnetic recording medium, which comprises providing a magnetic layer consisting of strong magnetic particles such as $Fe_3O_4$ and a resinous binder on a substrate such as plastic film, does scarcely permeate the laser beam because this magnetic layer takes the multilayer construction formed of magnetic particles and a resinous binder. Due to interposition of a resinous binder which does not take part in recording between the magnetic substances, recording density deteriorates and noise is caused thereby. Although it was proposed to pulverize magnetic powders as small as possible in order to attain high density recording, it was difficult to disperse said magnetic powders in the resinous binder and coating the same so as to orientate magnetization in the direction perpendicular to a tape (substrate). The present invention has also solved the problem like this simultaneously by forming a continuous thin film using the metal oxide magnetic substance alone represented by said general formula (I).

When intending to prepare the magnetic film using out metal oxide magnetic substance, although depending on the kind of the substrate, generally it may be prepared by adhering this magnetic substance onto the substrate so that the film thickness may be in the range of about 0.1–10 μm, holding the substrate temperature in the range of 400°–800° C. and by means of vacuum vapor-deposition, sputtering, ionplating spray-coating or the like. These means aim at orientating the magnetic substance perpendicularly to the film to be obtained by impressing a magnetic field during or after the process. The thus obtained megnetic film has been magnetized perpendicularly. In this instance, the magnetic film may be formed at a substrate temperature of not more than 400° C., but there is the necessity of heat-treating the thus formed magnetic film at a temperature of 500°–800° C., while impressing a magnetic field in case of necessity, for perpendicular magnetization. In the formation of the magnetic film like this, there is used a heat-resisting substrate. The substrate materials used herein generally include heat-resisting metals such as aluminum, nickel and the like; quartz glass; GGG (gallium.gadolinium.garnet); saphire; lithium tantalate; heat-resisting glass such as aluminosilicate glass; crystallized transparent glass; Pyrex glass; surface oxidation-treated or untreated single crystal silicone; transparent ceramic materials such as $Al_2O_3$, $Al_2O_3.MgO$, $MgO.LiF$, $Y_2O_3.-LiF$, $BeO$, $ZrO_2$, $Y_2O_3$, $ThO_2.CaO$ and the like; inorganic materials such as inorganic silicone materials (goods on the market such as Tosguard produced by Toshiba Silicone Co. and Sumicerum P Produced by Sumitomo Kagaku Co.) and the like, or organic materials such as polyimide resin, polysulfone resin, poluamide resin, and the like.

Next, explanation will be made about the magneto optical recording medium which is one typical use example of the magnetic film like this and the magneto optical recording method related therewith.

FIG. 1 is a sectional view illustrating the basic construction example of our magneto optical recording medium prepared as mentioned above, wherein a magnetic film 13 is provided on a transparent substrate 11. The thickness of said magnetic film, the method of preparing said film and the substrate used therefor are as already explained. In this instance, it is preferable to provide an undercoat film having an epitaxial effect on the substrate prior to the preparation of the magnetic film. A hexagonal ZnO thin film is suitably used as the undercoat film, and is formed to be in the range of about 0.1–0.3 μm by for instance sputtering. In this ZnO thin film, the axis C of the hexagonal ZnO is orientated perpendicularly to the substrate surface, and when a magnetic film is formed thereon the axis C of the magnetic substance is also orientated perpendicularly to the substrate surface. Write in (recording) and read out (regeneration) are carried out by radiating the modulated or polorized laser beam as indicated with the arrows from the side of substrate 11.

FIG. 2 is a sectional view illustrating another construction example of the magneto optical recording medium, wherein the magnetic film 13 is provided on the transparent substrate 11, and further a reflective film 15 is provided thereon. In this instance, write in and read out are also carried out by radiating the laser beam from the side of substrate 11. In the case of reading out, however, Faraday effect is increased in such a manner that the beam for use in reading out enters from the side of substrate 11 in the magnetic film 13, is reflected by the reflective film 15 and passes through the magnetic film again. The magnetic film of the present invention can obtain a large rotation angle, for instance can obtain a rotation angle of $\theta_F$=about 0.4–1.0 degree/μm using the laser beam of 633 nm, by utilizing such a reflection type Faraday effect, and further can increase said rotation angle several times by utilizing multiple reflection. The reflective film 15 can be formed by adhering Cu, Al, Ag, Au, Pt, Ph, TeOx, TeC, SeAs, TeAs, TiN, TaN, CrN, cyanine dye or the like on a target surface by means of vacuum vapordeposition, sputtering, ion-plating or the like so that the film thickness may be about 500–10000 Å.

FIG. 3 illustrates the magneto optical recording medium of FIG. 2 wherein a transparent dielectric layer is provided in the passing through region of the light beam, and the magnetic film 13, the transparent dielectric layer 17 and the reflective film 15 are provided on the transparent substrate 11 in the order named. Accordingly, write in and read out are carried out by radiating the laser beam (shown with the arrows) from the side of substrate 11 in the same manner as FIG. 1–FIG. 2. The transparent dielectric layer 17 is provided for the purpose of increasing Faraday's angle of rotation and enhancing regenerative output, and is formed by adhering $SiO_2$, SiO, $TiO_2$, TiO, CeO, $HfO_2$, BeO, $ThO_2$, $Si_3N_4$ or the like on a target surface by means of the same method as mentioned above so that the film thickness may be about 0.05–0.5 μm.

FIG. 4 is a sectional view illustrating a construction example wherein a guide track is provided for the purpose of guiding the laser beam on writing in and reading out. The magnetic film 13, guide track layer 19, reflective film 15 and protective film 21 are provided on the transparent substrate 11 in the order named. Write in and read out are effected by radiating the laser beam (shown with the arrows) from the side of substrate 11 in the same manner as FIG. 1–FIG. 3. The guide track layer 19 is formed by applying a ultraviolet ray-curing resin namely, photopolymer) on a target surface, thereafter radiating the ultraviolet ray thereto while press-attaching a mold having fine guide grooves, and curing said resin. The protective film 21 is provided for the purpose of protecting the reflective film 15 and may be transparent or opaque. This protective film 21 is formed by adhering acrylic resin, polycarbonate resin, polyether sulfone resin, polyamide resin, epoxy resin, TiN, $Si_3N_4$, TaN, $SiO_2$, SiO or the like on a target surface so that the resulting film thickness may be about 0.1–10 μm, by means of a coating process in the case of the resin and be means of vacuum vapor-deposition, sputtering, ion-plating or the like in the other case.

FIG. 5 is a view showing a modification example which is similar to the one of FIG. 4 with reference to the layer construction but different therefrom with reference to the layer function, preparing method and writing in and reading out methods (wherein, the arrow indicates the laser beam at the time of writing in and reading out). The substrate with a guide track (the so-called a pre-grooved substrate) 11' provided with the reflective film 15 and the heat-resisting layer 23 provided with the magnetic film 13 are connected by a transparent adhesive layer 25. That is, this transparent adhesive layer 25 may be said to be a mere layer for connecting the reflective film 15 on the substrate 11' with the magnetic film 13 on the protective film 21, and is formed by adhering the aforesaid both layers 15 and 13 by the use of epoxy resin, polyurethane resin, polyamide resin or the like so as to have a thickness of about 0.1–10 μm. The substrate with a guide track 11' may be transparent or opaque, and is formed by processing the above mentioned organic material according to the method of injection molding, extrusion molding or photoetching.

The heat-resisting layer 23 corresponds to the transparent substrate 11 of FIG. 1–FIG. 4, but is provided in the case of this example for the purpose of enhancing the heat resistance of the magnetic film 13. The heat-resisting layer is formed from the inorganic material for substrate as explained previously, and the proper thickness thereof is about 0.1–2 mm. In this connection, it is to be noted that is the above explanation, the term "transparent" means "to permeate the laser beam used".

Hereinbefore, the case of providing the magnetic film mainly on the transparent substrate was explained, but it is needless to say that the magnetic film can be formed on the opaque substrate. FIG. 6 illustrates the construction example of the magneto optical recording medium like this, wherein the reflective film 15, magnetic film 13 and transparent protective film 21' are provided on the opaque substrate (for instance, silicone wafer) 11' in the order named. Write in and read out are carried out by radiating the laser beam (indicated with the arrows) onto the magnetic film 13 from the side of protective film 21'. As the materials constituting the transparent protective film 21' there are used the transparent ones of those constituting the protective film 21.

FIG. 7 illustrates still another construction example, wherein the reflective film 15, undercoat film 29, magnetic film 13, guide track 19' and transparent protective film 21' are provided on a substrate 11" in the order named. The guide track 19' and the protective film 21' may be omitted. Write in and read out are conducted in the manner of radiating the laser beam from the side of protective film 21' as in the case of FIG. 6. The guide track 19' is formed for instance in the manner of applying an ultraviolet raycuring resin on the magnetic film 13, radiating the ultraviolet ray thereto after the pattern of guide track for curing the resin on the radiated portion, and then dissolving the radiated portion or the nonradiated portion using a proper solvent (for instance, aqueous alkali solution, alcohol or the like) and removing (namely, etching).

FIG. 8 illustrates a construction example using an opaque substrate with a guide track, wherein the reflective film 15, undercoat film 29, magnetic film 13 and transparent protective film 21' are provided on this substrate 11''' in the order named. The methods for writing in and reading out are the same as in FIG. 6. The opaque substrate 11''' with a guide track is formed for instance by electroforming nickel in a metal mold with a guide track-shaped groove. The guide track may be formed in the manner of adhering a metallic film onto a substrate, forming a photo-resist pattern thereon, and then etching said metallic film. The guide track may be formed directly on an opaque or transparent substrate. In this instance, a desired guide track is formed by forming a photo-resist pattern on a substrate, etching a non-pattern area (substrate) with a reactive ion, and then peeling the residual pattern off.

FIG. 9 is a sectional view illustrating a construction example wherein a magnetic film is put between two reflective films and one reflective film thereof is designed to be partly light-permeable. A first reflective film 15a, a undercoat film 29, a magnetic film 13, a second reflective film 15b which is partly light-permeable, a guide track 19' and a transparent protective film 21 are provided on an opaque substrate 11" in the order named. The first reflective film 15a is the so-called total reflection mirror, and the second reflective film 15b is the so-called half mirror. Write in and read out in this instance are carried out also in the same manner as in FIG. 6, but the laser beam for use in reading out is designed to do multiple reflection and pass through the magnetic film 13 many times, whereby the effective length of the magnetic film 13 is prolonged and a large Faraday's angle of rotation can be obtained. The material for constituting the first reflective film 15a may be the same as the material for constituting the normal reflective film. As the material for constituting the second reflective film 15b, on the other hand, there are used the material for the normal reflective film and a mixture of resin, transparent ceramic material and the like. The second reflective film 15b is formed by the method of coating, sputtering or the like. The thickness of the reflective films 15a and 15b may be the same as that of the normal reflective film 15.

As is evident from the above explanation, the magneto optical recording method applied to the magnetoc optical recording medium of the present invention is theoretically the exactly same as the usual one.

According to the present invention, there can be obtained a magnetic substance and a magnetic film, which are superior in perpendicular magnetizability and are of excellent magneto optical effect, by substituting a part of Fe atoms of the hexagonal magneto-plumbite which is the metal oxide free from oxidizing deterioration by a divalent cobalt, divalent-tetravalent metals represented by said Mb and the trivalent metal represented by said Ma respectively. Further, said magnetic substance and said magnetic film have moderate coercive force and Curie temperature, and are featured in that recording by means of laser beam is expedited by lowering of Curie temperature. Accordingly, the magnetic film formed of the magnetic substance like this is very useful for an element which is perpendicularly magnetized and utilizes Faraday effect of a permeating light, for instance a magneto optical recording medium, and further is superior in perpendicular magnetizability. Therefore, said magnetic film is useful for instance as a perpendicular magnetic recording medium.

Figure 1:
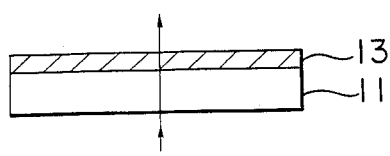
FIG. 1–FIG. 9 each is a sectional view illustrating a construction example of a magneto optical recording medium which uses a magnetic film consisted of the magnetic substance according to the present invention.
Figure 2:
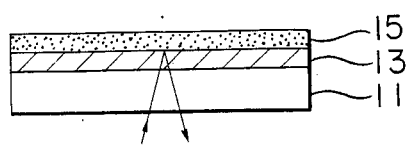
Figure 3:
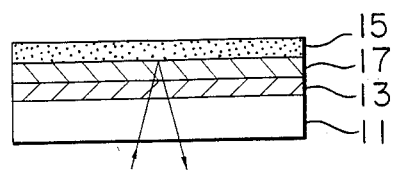
Figure 4:
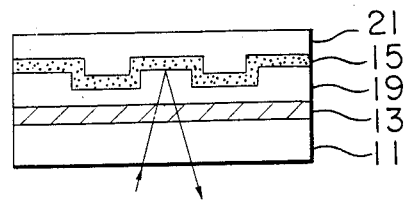
Figure 5:
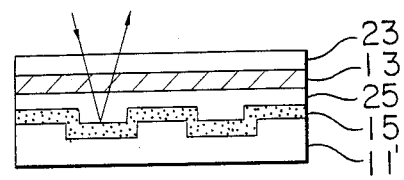
Figure 6:
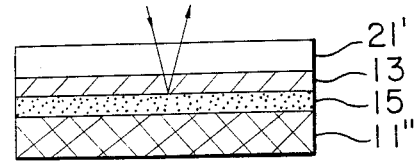
Figure 7:
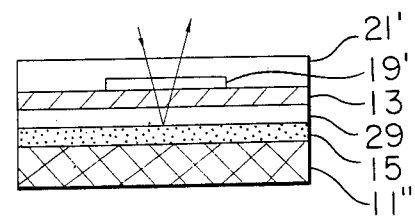
Figure 8:
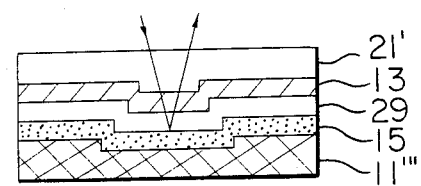
Figure 9:
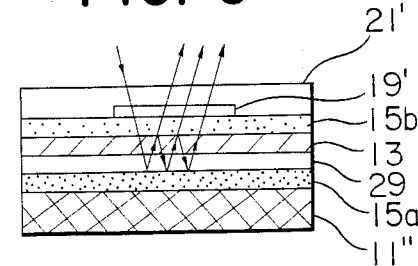

11: transparent or opaque substrate,
11': transparent substrate with a guide track,
11": opaque substrate,
11''': opaque substrate with a guide track,
13: magnetic film, 15 . . . reflective film,
15a: first reflective film,
15b: second reflective film,
17: transparent dielectric layer,
19: guide track layer, 19' . . . guide track,
21: transparent or opaque protective film,
21': transparent protective layer,
23: heat-resisting layer,
25: transparent adhesive layer,
29: undercoat film

DESCRIPTION OF THE PREFERRED EMBODIMENTS

Examples of the present invention will be given hereinafter. Every part referred to herein is part by weight.

EXAMPLE 1

$BaCO_3$: 19.73 parts
$\alpha$-$Fe_2O_3$: 73.46 parts
CoO: 8.99 parts
$Ga_2O_3$: 11.25 parts
$In_2O_3$: 16.7 parts These components were mixed and calcined at 1000° C. The obtained calcination was pulverized again and mixed, and calcined at 1100° C. Further, this calcination was pulverized again and calcined permanently to obtain the metal oxide magnetic substance No. 1-1 according to the present invention. On this permanent calcining, said calcination was worked into a disc target using 4-ich metal mold so that it may be subjected to sputtering for the purpose of forming a magnetic film.

Next, magnetic substances No. 1-2–1-15, No. 2-1-2-40, No. 3-1-3-15, No. 4-1-4-10, and No. 5-1-5-22 were prepared according to the same procedure and using necessary metal oxides in fixed amounts (for instance, $BaCO_3$ 19.73 parts, $\alpha$-$Fe_2O_3$ 162.89 parts, CoO 4.49 parts and $TiO_2$ 8.67 parts in the case of No. 2-1; $BaCO_3$ 19.73 parts, $Al_2O_3$ 12.23 parts, $\alpha$-$Fe_2O_3$ 153.3 parts, CoO 4.49 parts and $TiO_2$ 7.76 parts in the case of No. 3-1; $BaCO_3$ 19.73 parts, $\alpha$-$Fe_2O_3$ 162.89 parts, $Al_2O_3$ 6.12 parts, CoO 4.49 parts and $TiO_2$ 7.67 parts in the case of No. 4-1; and $BaCO_3$ 19.73 parts, $\alpha$-$Fe_2O_3$ 162.89 parts, CoO 4.49 parts and TaO$_2$ 12.78 parts in the case of No. 5-1). In this instance, these magnetic substances were also worked into disc targets on permanent calcining by the use of a metal mold respectively.

EXAMPLE 2

Each target obtained in Example 1 and having the composition as shown in the following table was sputtered on the undercoat film of a quartz substrate comprising forming an Au film of 1000 Å previously and forming a ZnO undercoat layer further thereon for 2 hours under the conditions of Ar partial pressure: 2.0 mm Torr, O$_2$ partial pressure: 0.3 mm Torr, discharge electric power: 0.35 KV, and substrate temperature: 600°–700° C. to thereby form a 0.5 μm-thick magnetic film. The results obtained by measuring these magnetic films with referemnce to Curie temperature Tc and coercive force Hc and further Faraday's angle of rotation of said magnetic films magnetized perpendicularly in one direction were shown in the following table.

| Composition of target (magnetic substance No.) | Tc (°C.) | Hc (K Oersted) | θF (deg/μm) |
| --- | --- | --- | --- |
| 1-1 | 210 | 2.5 | 0.80 |
| 1-2 | 205 | 2.0 | 0.95 |
| 1-3 | 160 | 3.0 | 0.85 |
| 1-4 | 230 | 3.0 | 0.50 |
| 1-5 | 320 | 5.0 | 0.62 |
| 1-6 | 230 | 4.0 | 0.70 |
| 1-7 | 230 | 1.5 | 0.45 |
| 1-8 | 150 | 1.5 | 0.65 |
| 1-9 | 280 | 2.6 | 0.60 |
| 1-10 | 210 | 2.0 | 0.45 |
| 1-11 | 150 | 1.5 | 0.55 |
| 1-12 | 235 | 2.0 | 0.53 |
| 1-13 | 235 | 1.5 | 0.38 |
| 1-14 | 310 | 1.0 | 0.60 |
| 1-15 | 210 | 1.0 | 0.52 |
| 2-1 | 350 | 3.0 | 0.57 |
| 2-2 | 400 | 2.0 | 0.43 |
| 2-3 | 330 | 2.0 | 0.51 |
| 2-4 | 340 | 2.5 | 0.62 |
| 2-5 | 300 | 3.0 | 0.47 |
| 2-6 | 280 | 1.0 | 0.70 |
| 2-7 | 380 | 2.0 | 0.60 |
| 2-8 | 350 | 2.5 | 0.41 |
| 2-9 | 330 | 2.5 | 0.40 |
| 2-10 | 330 | 2.0 | 0.44 |
| 2-11 | 340 | 2.0 | 0.40 |
| 2-12 | 330 | 2.0 | 0.52 |
| 2-13 | 360 | 2.0 | 0.47 |
| 2-14 | 350 | 2.5 | 0.45 |
| 2-15 | 360 | 2.5 | 0.43 |
| 2-16 | 370 | 2.0 | 0.60 |
| 2-17 | 340 | 2.5 | 0.65 |
| 2-18 | 330 | 2.0 | 0.51 |
| 2-19 | 360 | 2.0 | 0.46 |
| 2-20 | 360 | 2.0 | 0.52 |
| 2-21 | 350 | 2.0 | 0.67 |
| 2-22 | 360 | 3.0 | 0.85 |
| 2-23 | 340 | 3.5 | 0.75 |
| 2-24 | 400 | 2.0 | 0.65 |
| 2-25 | 390 | 2.0 | 0.46 |
| 2-26 | 400 | 2.0 | 0.72 |
| 2-27 | 400 | 1.5 | 0.82 |
| 2-28 | 370 | 2.5 | 0.72 |
| 2-29 | 380 | 1.5 | 0.74 |
| 2-30 | 370 | 1.5 | 0.60 |
| 2-31 | 380 | 1.5 | 0.56 |
| 2-32 | 350 | 2.5 | 0.50 |
| 2-33 | 360 | 1.5 | 0.64 |
| 2-34 | 300 | 1.0 | 0.40 |
| 2-35 | 340 | 2.0 | 0.47 |
| 2-36 | 370 | 2.5 | 0.52 |
| 2-37 | 340 | 1.5 | 0.49 |
| 2-38 | 340 | 1.5 | 0.32 |
| 2-39 | 340 | 1.5 | 0.35 |
| 2-40 | 370 | 2.5 | 0.52 |
| 3-1 | 350 | 3.0 | 0.67 |
| 3-2 | 360 | 2.5 | 0.85 |
| 3-3 | 350 | 1.5 | 0.62 |
| 3-4 | 300 | 2.5 | 0.46 |
| 3-5 | 330 | 2.0 | 0.42 |
| 3-6 | 350 | 3.0 | 0.58 |
| 3-7 | 340 | 3.0 | 0.42 |
| 3-8 | 330 | 2.5 | 0.30 |
| 3-9 | 330 | 2.0 | 0.46 |
| 3-10 | 340 | 2.5 | 0.48 |
| 3-11 | 350 | 2.5 | 0.62 |
| 3-12 | 350 | 2.3 | 0.65 |
| 3-13 | 340 | 2.0 | 0.70 |
| 3-14 | 350 | 2.5 | 0.64 |
| 3-15 | 350 | 3.5 | 0.42 |
| 4-1 | 390 | 1.7 | 0.83 |
| 4-2 | 350 | 1.0 | 0.90 |
| 4-3 | 390 | 1.8 | 0.58 |
| 4-4 | 400 | 2.0 | 0.68 |
| 4-5 | 370 | 1.2 | 0.86 |
| 4-6 | 400 | 2.0 | 0.64 |
| 4-7 | 370 | 1.3 | 0.62 |
| 4-8 | 380 | 1.5 | 0.76 |
| 4-9 | 320 | 1.0 | 0.68 |
| 4-10 | 360 | 1.2 | 0.84 |
| 5-1 | 400 | 1.3 | 0.58 |
| 5-2 | 400 | 2.3 | 0.68 |
| 5-3 | 370 | 1.5 | 0.76 |
| 5-4 | 380 | 2.0 | 0.72 |
| 5-5 | 360 | 1.2 | 0.61 |
| 5-6 | 360 | 1.2 | 0.43 |
| 5-7 | 380 | 1.3 | 0.74 |
| 5-8 | 360 | 1.0 | 0.35 |
| 5-9 | 400 | 1.5 | 0.52 |
| 5-10 | 370 | 1.0 | 0.34 |
| 5-11 | 390 | 1.0 | 0.32 |
| 5-12 | 380 | 1.3 | 0.38 |
| 5-13 | 390 | 1.0 | 0.36 |
| 5-14 | 400 | 1.5 | 0.42 |
| 5-15 | 390 | 1.2 | 0.36 |
| 5-16 | 380 | 1.4 | 0.48 |
| 5-17 | 360 | 1.7 | 0.56 |
| 5-18 | 320 | 2.0 | 0.82 |
| 5-19 | 390 | 1.0 | 0.72 |
| 5-20 | 400 | 2.5 | 0.86 |
| 5-21 | 400 | 1.0 | 0.62 |
| 5-22 | 380 | 1.0 | 0.56 |

Next, the magnetic film of each of the thus obtained magneto optical recording mediums was perpendicularly magnetized in one direction. Thereafter, a laser beam having an output of 20 mW and a wavelength of 633 nm was radiated at a pulse of frequency: 1 MHz so that the luminous intensity on the recording medium surface might be 10 mW, while impressing a magnetic field of 0.5K oersted reverse to said magnetizing direction, for magnetic inversion. On every recording medium, there was formed a recorded bit having a diameter of about 1.5 μm.

EXAMPLE 3

A ZnO film having a thickness of 2000 Å was formed on a monocrystal silicon wafer by sputtering under the conditions: atmospheric oxygen gas pressure $2 \times 10^{-3}$ Torr and substrate temperature 400° C, for 1 hour. A MnO$_{0.6}$.ZnO$_{0.4}$.Fe$_2$O$_3$ film having a thickness of 5000 Å was formed thereon by 2 hours' sputtering under the conditions: atmospheric gas pressure $2 \times 10^{-3}$ Torr (Ar/O$_2$=1.8/0.2×10$^{-3}$ Torr te). A magnetic film having a thickness of 5000 Å was further adhered thereon using a magnetic substance target having a composition BaO.6.0[Ga$_{0.06}$Co$_{0.06}$Ti$_{0.03}$Fe$_{1.86}$O$_3$] by 2 hours' sputtering under the conditions: atmospheric gas pressure $2\times10^{-3}$ Torr ($O_2/Ar=1/6$) and substrate temperature 570° C. to thereby obtain a perpendicular magnetic recording medium. Then, this recording medium was subjected to recording under the conditions: gap width of ferrite ring head (number of turns N=50 T) and relative speed of recording medium to head 1.51 m/s. The recording density $D_{50}$ was found to be 50 k FRPI.

EXAMPLE 4

A perpendicular magnetic recording medium was prepared according to the same procedure as Example 3 except that alumina was used as the substrate material and a magnetic substance target having a composition $SrO.6.0[Cr_{0.04}V_{0.03}Co_{0.06}Fe_{1.88}O_3]$ was employed. The recording density $D_{50}$ of this recording medium was found to be 65 k FRPI.

We claim:

1. A substrate and a magnetic film thereon comprising polycrystals of a metal oxide magnetic substance represented by the following general formula:

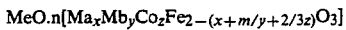
$$MeO.n[Ma_xMb_yCo_zFe_{2-(x+m/y+2/3z)}O_3]$$

wherein, Me, Ma, Mb, x, y, z, m and n are each as mentioned below:
- Me: at least one divalent metal selected from the group consisting of Ba, Sr and Pb,
- Ma: at least one trivalent metal selected from the group consisting of Ga, Al, Cr and Rh,
- Mb: at least one divalent to tetravalent metal selected from the group consisting of Zn (divalent); Ni, In, Sc, Cr, Sb, Bi, Y and Sm (trivalent), and Mo, Ti, Sn, Ta, V, Mn, Ir, Hf, Pd, Nb, Re, Pt, Os, Zr, Tc, Rh, Ge, Ru, W, Te, Pr and Ce (tetravalent) (wherein, the metal represented by Mb is not the same as that represented by Me or Ma)
- x: $0<x\leq0.5$
- y: $0<y\leq0.5$
- z: $0<z\leq0.5$ (wherein, $0<x+y+z\leq1$)
- m: an ionic valency of Mb
- n: $5\leq n\leq6$, and wherein said minute polycrystals of the magnetic film are arranged to form a continuous thin film on the substrate and have a strong crystal magnetic anisotropy in the direction perpendicular to the surface of the magnetic film.

2. A magnetic film according to claim 1 which is selectively magnetized for use as a magneto optical recording medium.

3. A magnetic film according to claim 1 which is selectively magnetized perpendicularly to its plane for use as a perpendicular magnetic recording medium.

4. A magneto optical recording medium comprising a magnetic film on a substrate and an undercoat film between the substrate and the magnetic film, wherein said undercoat film has an epitaxial effect in the region between the substrate and the magnetic film, and wherein the magnetic film consists essentially of a metal oxide magnetic substance represented by the following general formula:

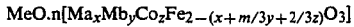
$$MeO.n[Ma_xMb_yCo_zFe_{2-(x+m/3y+2/3z)}O_3]$$

wherein, Me, Ma, Mb, x, y, z, m and n are each as mentioned below:
- Me: at least one divalent metal selected from the group consisting of Ba, Sr and Pb,
- Ma: at least one trivalent metal selected from the group consisting of Ga, Al, Cr and Rh,
- Mb: at least one divalent to tetravalent metal selected from the group consisting of Zn (divalent); Ni, In, Sc, Cr, Sb, Bi, Y and Sm (trivalent), and Mo, Ti, Sn, Ta, V, Mn, Ir, Hf, Pd, Nb, Re, Pt, Os, Zr, Tc, Rh, Ge, Ru, W, Te, Pr and Ce (tetravalent) (wherein, the metal represented by Mb is not the same as that represented by Me or Ma)
- x: $0<x\leq0.5$
- y: $0<y\leq0.5$
- z: $0<z\leq0.5$ (wherein, $0<x+y+z\leq1$)
- m: an ionic valency of Mb
- n: $5\leq n\leq6$.

5. A recording medium according to claim 4, wherein said magnetic film is 0.1–10 μm thick.

6. A recording medium according to claim 4, wherein said undercoat film has a thickness of 0.1–0.3 μm.

7. A magneto optical recording medium as in claim 4, including a reflective film over said magnetic film.

8. A magneto optical recording medium according to claim 7, wherein said magnetic film and said reflective film are 0.1–10 μm and 500–100000 Å thick respectively.

9. A magneto optical recording medium as in claim 4, including a transparent dielectric layer over said magnetic film and a reflective film over said transparent dielectric layer.

10. A recording medium according to claim 9, wherein the thickness of said magnetic film, transparent dielectric layer and reflective film is 0.1–10 μm, 0.05–0.5 μm and 500–10000 Å respectively.

11. A magneto optical recording medium as in claim 9, wherein said undercoat film is 0.1–0.3 μm thick.

12. A magneto optical recording medium as in claim 4, including a guide track layer over said magnetic film, a reflective film over said guide track layer and a protective layer over said reflective film.

13. A recording medium according to claim 12, wherein the thickness of said magnetic film, said reflective film and said protective layer is 0.1–10 μm, 500–10000 Å, and 0.1–10 μm respectively.

14. A magneto optical recording medium as in claim 12, wherein said undercoat film is 0.1–0.3 μm thick.

15. A magneto optical recording medium as in claim 4, wherein said substrate comprises a guide track, and including a reflective film over said guide track layer, a transparent adhesive layer over said reflective layer, wherein said magnetic film is over said transparent adhesive layer, and a transparent heat-resisting layer over said magnetic layer.

16. A recording medium according to claim 15, wherein the thickness of said reflective film, said transparent adhesive layer, said magnetic film and said transparent heat-resisting layer is 500–10000 Å, 0.05–05 μm, 0.1–10 μm and 0.1–2 mm respectively.

17. A magneto optical recording medium as in claim 4, including a reflective film between said substrate and said magnetic film, and a transparent protective film over said magnetic film.

18. A recording medium according to claim 17, wherein the thickness of said reflective film, said magnetic film and said transparent protective film is 500–10000 Å, 0.1–10 μm and 0.1–10 μm respectively.

19. A magneto optical recording medium as in claim 4, including a reflective film between said substrate and said undercoat film.

20. A recording medium according to claim 19, wherein the thickness of said reflective film, said undercoat film and said magnetic film is 500–10000 Å, 0.1–0.3 μm, and 0.1–10 μm respectively.

21. A magneto optical recording medium as in claim 4, including a reflective film between said substrate and said undercoat film, a guide track over said magnetic film, and a transparent protective film over said guide track.

22. A recording medium according to claim 21, wherein the thickness of said reflective film, said undercoat film, said magnetic film and said transparent protective film is 500–10000 Å, 0.1–0.3 μm, 0.1–10 μm and 0.1–10 μm respectively.

23. A magneto optical recording medium as in claim 4, wherein said substrate has a guide track, and including a reflective film between said substrate and said undercoat film, and a transparent protective film over said magnetic film.

24. A recording medium according to claim 23, wherein the thickness of said reflective layer, said undercoat film, said magnetic film and said transparent protective layer is 500–10000 Å, 0.1–0.3 μm, 0.1–10 μm and 0.1–10 μm respectively.

25. A magneto optical recording medium as in claim 5, including a first reflective film which is between said substrate and said undercoat film and has no light permeability, a second reflective film which is over said magnetic film and partially light-permeable, a guide track over said second reflective film, and a transparent protective film over said guide track.

26. A recording medium according to claim 25, wherein the thickness of said first reflective film, said undercoat film, said magnetic film, said second reflective film and said transparent protective film is 500–10000 Å, 0.1–0.3 μm, 0.1–10 μm, 500–10000 Å and 0.1–10 μm respectively.

* * * * *